US012737776B2

(12) United States Patent
Ina et al.

(10) Patent No.: US 12,737,776 B2
(45) Date of Patent: Sep. 15, 2026

(54) OPTICAL DESIGN METHOD AND DIFFRACTIVE OPTICAL ELEMENT

(71) Applicant: KOWA COMPANY, Ltd., Nagoya (JP)

(72) Inventors: Hideki Ina, Nagoya (JP); Yasunari Oguchi, Nagoya (JP); Jun Maruyama, Nagoya (JP)

(73) Assignee: KOWA COMPANY, Ltd., Aichi (JP)

( * ) Notice: Subject to any disclaimer, the term of this patent is extended or adjusted under 35 U.S.C. 154(b) by 320 days.

(21) Appl. No.: 18/529,526

(22) Filed: Dec. 5, 2023

(65) Prior Publication Data

US 2024/0202745 A1 Jun. 20, 2024

(30) Foreign Application Priority Data

Dec. 14, 2022 (JP) ................................ 2022-199520

(51) Int. Cl.

| | |
|---|---|
| ***G06Q 30/018*** | (2023.01) |
| ***G06F 21/10*** | (2013.01) |
| ***G06Q 20/40*** | (2012.01) |
| ***H04L 9/00*** | (2022.01) |

(52) U.S. Cl.
CPC ..... *G06Q 30/0185* (2013.01); *G06F 21/1014* (2023.08); *G06Q 20/401* (2013.01); *H04L 9/50* (2022.05)

(58) Field of Classification Search
CPC .... G06Q 30/0185; G06F 21/1014; H04L 9/50
See application file for complete search history.

(56) References Cited

U.S. PATENT DOCUMENTS

2016/0306079 A1* 10/2016 Arbabi ................. G02B 5/0268

FOREIGN PATENT DOCUMENTS

| | | |
|---|---|---|
| JP | 2001-357377 | 12/2001 |
| JP | 2018-31896 | 3/2018 |
| JP | 2018-173812 | 11/2018 |
| JP | 2020-35197 | 3/2020 |

(Continued)

OTHER PUBLICATIONS

International Search Report issued in International Application No. PCT/JP2022/040241 on Jan. 17, 2023.

(Continued)

*Primary Examiner* — Lucy P Chien
(74) *Attorney, Agent, or Firm* — Wenderoth, Lind & Ponack, L.L.P.

(57) ABSTRACT

An optical design method attempting facilitation of optical design of a configuration including a metalens. The optical design method includes a setting step, a first calculating step, a first identifying step, a second calculating step, a second identifying step, and a designing step. The first calculating step calculates first phase data indicating a relation of a phase to a shape of a meta-atom based on a preliminarily set first wavelength. The first identifying step calculates a first phase pattern from a first step pattern and identifies a fine pattern indicating the shape of the meta-atom corresponding to the first phase pattern by referring to the first phase data. The second calculating step calculates second phase data different from the first phase data based on a preliminarily set second wavelength different from the first wavelength.

3 Claims, 12 Drawing Sheets

(56) References Cited

FOREIGN PATENT DOCUMENTS

| | | |
|---|---|---|
| JP | 2020-68388 | 4/2020 |
| JP | 2020-86055 | 6/2020 |
| JP | 2020-170360 | 10/2020 |
| JP | 6829927 | 2/2021 |
| JP | 2021-71727 | 5/2021 |
| JP | 6894033 | 6/2021 |
| WO | 2014/207890 | 12/2014 |
| WO | 2020/080537 | 4/2020 |

OTHER PUBLICATIONS

Yasuhiro Mizutani, O plus E; Nanostructured Optics, Jan./Feb. 2021 issue; vol. 43, No. 1 (No. 477), pp. 1-7.

Optical and Electro-Optical Engineering Contact, Nov. 2021 issue, p. 26.

Arbabi et al., "Subwavelength-thick lenses with high numerical apertures and large efficiency based on high-contrast transmitarrays", Nature Communications, vol. 6, Article No. 8069, May 2015.

* cited by examiner r^2 VS Phase
λ1
P3
P2
P1
p3
p2
p1
21
d1
d2
d3
P1
P2
P3
1

P3
P2
P1

9
w1
w2
w1=w2

9
w1
w2
w1≠w2

9
w1
w2
w1≠w2

OPTICAL DESIGN METHOD AND DIFFRACTIVE OPTICAL ELEMENT

BACKGROUND OF THE INVENTION

1. Technical Field

The present invention relates to an optical design method and a diffractive optical element.

2. Related Art

Recently, the development of diffractive optical elements has been attracting attention. The diffractive optical element (DOE) is an element that controls a light using a diffraction action, and exhibits element characteristics different from conventional lenses that control a light using a refraction action and a reflection action. The diffractive optical element is known to correct a chromatic aberration when used in combination with a conventional lens, and allows designing an optical system configured to be compact and lightweight. Disclosed techniques related to the diffractive optical element include, for example, JP-A-2020-86055, JP-A-2018-31896, JP-A-2021-71727, O plus E January/February 2021 issue (No. 477), 43, page 1-7, OPTICAL AND ELECTRO-OPTICAL ENGINEERING CONTACT, November 2021 issue, page 26, and Nature Communications volume 6, Article number: 8069 (2015). In the following description, information indicative of a degree to which a conventional lens or a diffractive optical element changes a state of a light beam by refracting a light or reflecting a light is referred to as "optical action information." For example, as an example of the optical action information, wavefront information indicative of characteristics of a transmitted wavefront or a reflected wavefront of the conventional lens or the diffractive optical element is used in some cases.

As the diffractive optical element, for example, a Fresnel lens and multi-stepped binary optics (BO) are proposed and employed. As an optical design method for a configuration in which a binary optic and a conventional lens are used in combination, an equivalent refractive index method (also referred to as a high refractive index method) is used in some cases. The optical design method described above uses, for example, optical design software that expresses a diffracted light of a diffractive optical element and performs ray tracing on the conventional lens with information of the diffracted light. As the optical design software, "CODE V (registered trademark)," "ZEMAX (registered trademark)," "OSLO," and the like are commercially available. The above-described software mainly uses the equivalent refractive index method, and a calculation example thereof is disclosed in, for example, O plus E January/February 2021 issue (No. 477), 43, page 1-7.

Here, a "metalens" (also referred to as a "flat optic") that can be classified as one of the diffractive optical elements has been especially attracting attention among the diffractive optical elements, and has been actively studied and developed. As a characteristic of the metalens, instead of the multi-stepped shape like the binary optics, a fine pattern of a wavelength or less is formed on a flat substrate of glass or the like, thereby causing a desired diffraction action.

The metalens has, for example, a structure with a lens action among structures referred to as metasurfaces in which a fine pattern is formed by a single exposure and etching. As a characteristic of the metalens, the metalens has a flat shape. Therefore, compared with the binary optics, the metalens can be configured to be compact, and various applications are expected. The fine pattern formed as the metalens includes, for example, the content disclosed in JP-A-2020-86055.

When a metamaterial having a configuration with a lens action is used, the number of times of exposure may be, for example, twice or more other than once. Here, first, a structure formed by a single exposure (what is called a metasurface) will be described as a "metalens" with reference to FIG. 10A and the following drawings.

For example, FIG. 10A to FIG. 10D are schematic diagrams illustrating a relation between a conventional lens, a Fresnel lens, a binary optic, and a metalens. FIG. 10A illustrates a structure of the conventional lens, FIG. 10B illustrates a structure of the Fresnel lens, FIG. 10C illustrates a structure of the binary optic, and FIG. 10D illustrates a structure of the metalens.

In the metalens of FIG. 10D, a first pattern P1, a second pattern P2, and a third pattern P3 are examples illustrating mutually different types of fine pattern. In the order of the first pattern P1, the second pattern P2, and the third pattern P3, regions occupied by element materials, such as glass, in the respective configurations are small (P1<P2<P3), and an "effective refractive index" disclosed in JP-A-2020-86055 exhibits a tendency to become low in the order of the first pattern P1, the second pattern P2, and the third pattern P3 (P1<P2<P3). With reference to FIG. 10D illustrating a cross-sectional view of the metalens, while the patterns P1, P2, and P3 are compared based on the area, actually the patterns P1, P2, and P3 can be compared based on the volume (the shape of a meta-atom).

The respective patterns P1, P2, and P3 are designed with sizes equal to or less than a wavelength of an optical system to be used. In order to reduce the difficulty in processing the fine pattern, respective dimensions and pitches of widths are preferred to be large. For example, in a case where a metalens is used in transmission, when a diffracted light like a diffraction grating is generated from the metalens, a transmittance of a light transmitted without being diffracted (a zero-order light) decreases. Therefore, in the processing of the fine pattern, a trade-off between the processing difficulty and the transmittance of the zero-order light needs to be optimized depending on the usage. For example, in a case of a normal incidence, an angle of a first-order diffracted light from the diffraction grating becomes 90 degrees when the pitch and the wavelength are equal. However, considering a case of an oblique incidence, the pitch approximately half or less the wavelength is preferable when priority is given to the transmittance.

JP-A-2020-86055 proposes a metalens with a pattern configured in consideration of an influence of what is called "microloading" in which a shape to be etched changes depending on a difference of pattern density generated in the etching. FIG. 10D illustrates a case where the height is low as an example in which only the first pattern P1 is influenced by the "microloading." The use of the metalens allows avoiding "Shadowing Effect" considered as a problem in the binary optics, and allows forming an image excellent in optical performance without a flare light.

Here, FIG. 11 is a schematic diagram illustrating an example of a "Shadowing Effect" phenomenon. A light (L1 in FIG. 11) refracted by a stepped vertical portion becomes an unnecessary light unlike a light diffracted by a binary optic to be used, and becomes a flare light or the like to an image in image forming. Additionally, it is difficult to apply antireflection coating to a flat portion of the binary optic. Therefore, a reflected light (L2 in FIG. 11) at the flat portion is possibly generated as an unnecessary light as well, and this causes deterioration of the optical property. In contrast, the metalens uses a diffracted light including a refracted light and a reflected light from a structure portion of a stepped portion, and the size of the fine pattern is equal to or less than the wavelength, thus providing a characteristic of what is called "structural antireflection." Therefore, the metalens does not generate an unnecessary light which is generated in the binary optic, thus allowing not causing the occurrence of the "Shadowing Effect."

SUMMARY OF THE INVENTION

Here, as a characteristic of the metalens, it has been known that light is trapped (an optical trap) by the fine pattern of a wavelength or less constituting the metalens. In this respect, in the conventional optical design method using the equivalent refractive index method, expressing the diffracted light is not assumed. Therefore, in the conventional optical design method using the equivalent refractive index method, it is difficult to design a configuration including a diffractive optical element, such as a metalens. The "optical trap" will be described later.

In order to clarify the above-described basis, first, the "effective refractive index" will be described. For example, as described in JP-A-2020-86055, the "effective refractive index" can be represented by a density of glass per unit volume in sparseness/denseness of the fine pattern of a wavelength or less like the metalens. Based on this point, a concept of the "effective refractive index" will be described using FIG. 12A to FIG. 12C. Arrows illustrated in FIG. 12A to FIG. 12C indicate lights.

First, as is well known, a speed V when a light travels in a certain material is expressed by a formula (1) below related to a light speed C in a vacuum and a refractive index N of the material.

$$V = C/N \tag{1}$$

From the formula (1), the refractive index can be considered as a coefficient that decreases the speed of the light in the material. The above consideration may be applied when the material is uniform. However, for example, as illustrated in FIG. 12A, in a configuration of air and a material 9 having the refractive index N, in consideration of the combination of the light speeds C in both of them, the speed V is assumed to be an average value thereof. Therefore, as the coefficient for determining the speed, the "effective refractive index" is assumed to be used.

For example, when the widths of the air and the material 9 having the refractive index N are the same as illustrated in FIG. 12A, the average value may be used. However, as illustrated in FIG. 12B, when the widths of the air and the material 9 having the refractive index N are different, the "effective refractive index" is assumed to be determined by multiplying a weight corresponding to a ratio between the widths.

For example, when the widths of the air and the material 9 having the refractive index N illustrated in FIG. 12A and FIG. 12B are large compared with a transmitted wavelength, for the speed of light, instead of considering the two regions together, the speeds of light in the two regions are treated as different speeds, and considered as a phenomenon caused by a prism (a lens is considered as a configuration of a plurality of different prisms) in which the wavefront changes in one direction as in the binary optics. On the other hand, in a case of the fine pattern of a wavelength or less like the metalens, the fine pattern cannot be separated into the two regions as described above. Therefore, in order to consider the behavior of the wavefront with an ensemble average, the "effective refractive index" is effective. JP-A-2020-86055 proposes the "effective refractive index" in consideration of the influence of the "microloading."

For example, FIG. 12C illustrates an example of the material 9 having a shape including two different fine patterns. When the material 9 is placed in air, the phase of light slows down in a region in which the occupancy of an element material (for example, a glass material) of the material 9 is high compared with a region in which the occupancy of the element material is low. That is, the value of the "effective refractive index" tends to be large in proportion to the occupancy of the element material. The value of the "effective refractive index" determined by the material 9 is referred to as a "linear component." In a case of being transmitted through the shape of the fine pattern finer than the wavelength like the metalens, a "nonlinear component" described below needs to be taken into consideration. The following describes this.

For example, JP-A-2020-86055 discloses the content in consideration of only the linear component, and the "nonlinear component" described below is not considered. The need to consider the "nonlinear component" is caused by the optical trap described above. For example, since the metalens traps light like an optical waveguide, and its effect causes the delay of light and a phase lag, the nonlinear component affects the effective refractive index. Since such a nonlinear component is present, it is considered to be difficult to use the equivalent refractive index method in performing the optical design of the metalens.

Here, the optical trap will be described using the description of JP-A-2018-31896. JP-A-2018-31896 proposes an optical buffer element for a high-speed optical communication router, and utilizes a phenomenon of changing a relative magnetic permeability to provide a "negative refractive index" by forming a metamaterial with a metal microstructure that resonates with an electromagnetic field of light. This metamaterial has a negative refractive index, and the negative Goos-Hanchen shift allows decreasing the traveling speed of light. This phenomenon is referred to as an "optical trap effect." For example, by placing the metamaterial on an optical waveguide, a propagation delay of light can be caused. Thus, by loading a metamaterial structure on a silicon optical waveguide, a variable delay buffer can be obtained, and this uses a phenomenon of delay caused by the optical trap. Since the "delay" means decreasing the traveling speed of light, the effective refractive index exhibits a high value.

While JP-A-2018-31896 describes the metamaterial as a target, since a fine pattern of a wavelength or less acts as an optical waveguide, a metalens as a metasurface is formed with a fine pattern of a wavelength or less, and the optical trap occurs in the metalens as well. Therefore, in order to obtain a diffracted light of the metalens in consideration of the light trap, it is necessary to use an optical simulation of a vector model that strictly calculates from Maxwell's equations, a finite element method (FEM), a finite-difference time-domain method (FDTD method), or the like. O plus E January/February 2021 issue (No. 477), 43, page 1-7 indicates an example thereof.

Furthermore, the "nonlinear component" of a phase change due to the "optical trap effect" will be described using a result of the optical simulation of a vector model on the fine pattern of a wavelength or less as described in Nature Communications volume 6, Article number: 8069 (2015). FIG. 1 of Nature Communications volume 6, Article number: 8069 (2015) illustrates a relation between a transmittance and a phase when the cylinder diameter of a "meta-atom" of the fine pattern is changed as the result of the optical simulation of a vector model. FIG. 13 illustrates a result equivalent thereto. As conditions for this calculation, the wavelength is 1550 nm, the material is amorphous silicon with a refractive index of 3.43, the height of a cylinder is 940 nm, and the FDTD is used based on the above-described conditions (while hexagonal and square lattice periodic HCTAs are described, the shape after a pattern transfer and etching is a circular shape, and therefore, it is expressed as the "cylinder" here).

In FIG. 13, the horizontal axis indicates the cylinder diameter of a meta-atom, the vertical axis indicates a value obtained by dividing a phase by $2\pi$, and the plot indicates a relation of the phase to the shape of the meta-atom. If the phase were affected by only the "linear component," the "effective refractive index" would linearly change. Thus, the phase linearly changes as well when the horizontal axis is changed to the square of the cylinder radius. However, as illustrated in FIG. 13, the phase changes not linearly but nonlinearly. Thus, the "effective refractive index" of the fine pattern of a wavelength or less is determined by not the "linear component" alone but both of the "linear component" and the "nonlinear component."

JP-A-2021-71727 discloses an optical system having a configuration including a metalens, and describes an "identical phase delay profile," but does not describe, for example, how to actually perform optical design, and it is difficult to solve the above-described circumstance.

OPTICAL AND ELECTRO-OPTICAL ENGINEERING CONTACT, November 2021 issue, page 26 discloses a technique related to optical design of a metalens using a supercomputer. However, since it is not easy for conventional optical designers to use a supercomputer, the optical design of a configuration including a metalens is desired to be facilitated.

Accordingly, even based on the techniques disclosed in JP-A-2020-86055, JP-A-2018-31896, JP-A-2021-71727, O plus E January/February 2021 issue (No. 477), 43, page 1-7, OPTICAL AND ELECTRO-OPTICAL ENGINEERING CONTACT, November 2021 issue, page 26, and Nature Communications volume 6, Article number: 8069 (2015), an attempt at facilitating the optical design of a configuration including a metalens is difficult.

Therefore, the present invention has been made in consideration of the above-described problem, and it is an object of the present invention to provide an optical design method and a diffractive optical element for facilitating optical design of a configuration including a metalens.

An optical design method according to a first invention includes: a setting step of setting a first step pattern provided to a binary optic based on optical design of a configuration in which the binary optic and a conventional lens are used in combination; a first calculating step of calculating first phase data indicating a relation of a phase to a shape of a meta-atom based on a preliminarily set first wavelength; a first identifying step of calculating a first phase pattern from the first step pattern and identifying a fine pattern indicating the shape of the meta-atom corresponding to the first phase pattern by referring to the first phase data; a second calculating step of calculating second phase data different from the first phase data based on a preliminarily set second wavelength different from the first wavelength; a second identifying step of identifying a second phase pattern corresponding to the fine pattern by referring to the second phase data; and a designing step of designing the conventional lens based on the second phase pattern.

In the optical design method according to a second invention, which is in the first invention, the designing step includes identifying a second step pattern corresponding to the second phase pattern and designing the conventional lens based on the second step pattern.

An optical design method according to a third invention includes: a setting step of setting a first step pattern provided to a binary optic; a first calculating step of calculating first phase data indicating a relation of a phase to a shape of a meta-atom based on a preliminarily set first wavelength; and a first identifying step of calculating a first phase pattern from the first step pattern and identifying a fine pattern indicating the shape of the meta-atom corresponding to the first phase pattern by referring to the first phase data.

In the optical design method according to a fourth invention, which is in the third invention, the setting step sets the first step pattern based on optical design of a configuration in which the binary optic and a conventional lens are used in combination.

The optical design method according to a fifth invention, which is in the third invention or the fourth invention, further includes: a second calculating step of calculating second phase data different from the first phase data based on a preliminarily set second wavelength different from the first wavelength; and a second identifying step of identifying a second phase pattern corresponding to the fine pattern by referring to the second phase data.

In the optical design method according to a sixth invention, which is in any one of the first invention to the fourth invention, the first calculating step calculates the first phase data using an optical simulation of a vector model.

A diffractive optical element according to a seventh invention is produced by the optical design method according to any one of the first invention to the fourth invention.

According to the first invention to the seventh invention, the setting step sets the first step pattern provided to the binary optic. The first identifying step calculates the first phase pattern from the first step pattern and identifies the fine pattern indicating the shape of the meta-atom corresponding to the first phase pattern by referring to the first phase data. Therefore, the fine pattern necessary for design of a metalens can be identified using the first step pattern that can be set by a conventional method. This allows easily achieving the optical design of the configuration including the metalens.

According to the first invention and the fourth invention, the setting step sets the first step pattern based on the optical design of the configuration in which the binary optic and the conventional lens are used in combination. The first identifying step calculates the first phase pattern from the first step pattern and identifies the fine pattern indicating the shape of the meta-atom corresponding to the first phase pattern by referring to the first phase data. Therefore, the fine pattern necessary for the design of the metalens can be identified using the first step pattern based on the use in combination with the conventional lens. This allows attempting facilitation of the optical design of the configuration in which the metalens and the conventional lens are used in combination.

DETAILED DESCRIPTION OF THE INVENTION

Figure 1:
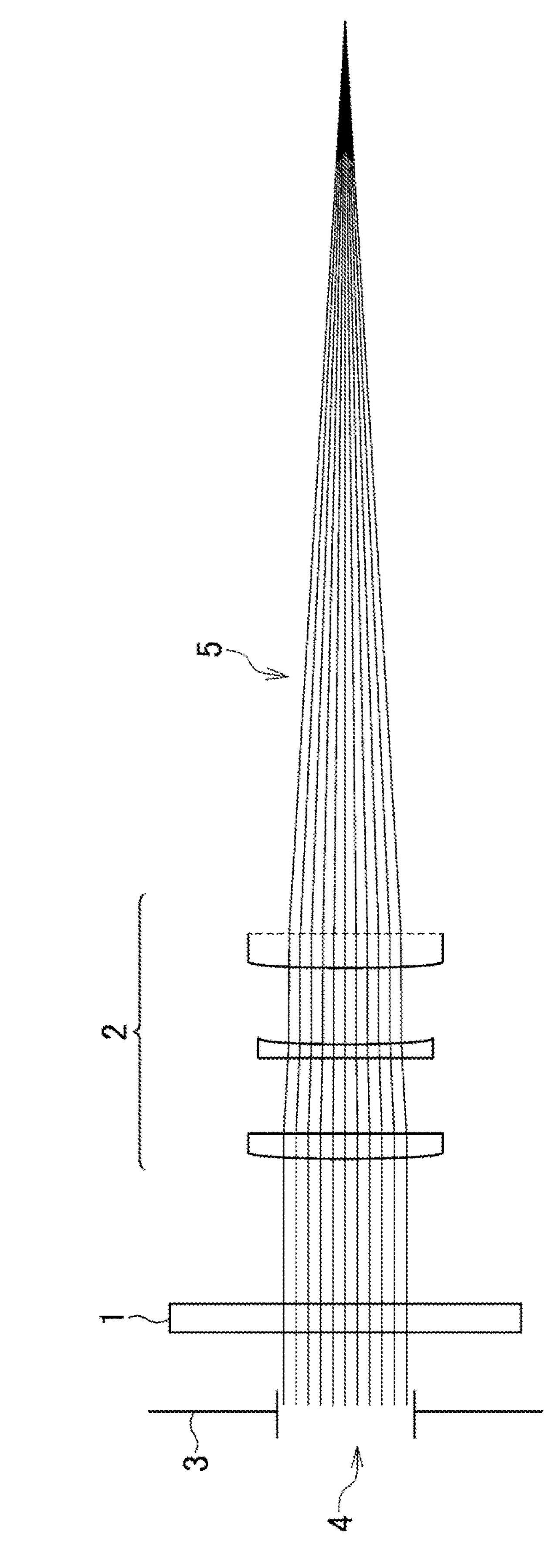
FIG. 1 is a schematic diagram illustrating an example of a configuration in which a metalens and a conventional lens are used in combination.

The following describes an example of an optical design method as an embodiment of the present invention with reference to the drawings. Configurations in the respective drawings are schematically illustrated for explanation, and the shape, the thickness, and the like in each configuration may be different from those in the drawings.

Embodiments

Figure 2:
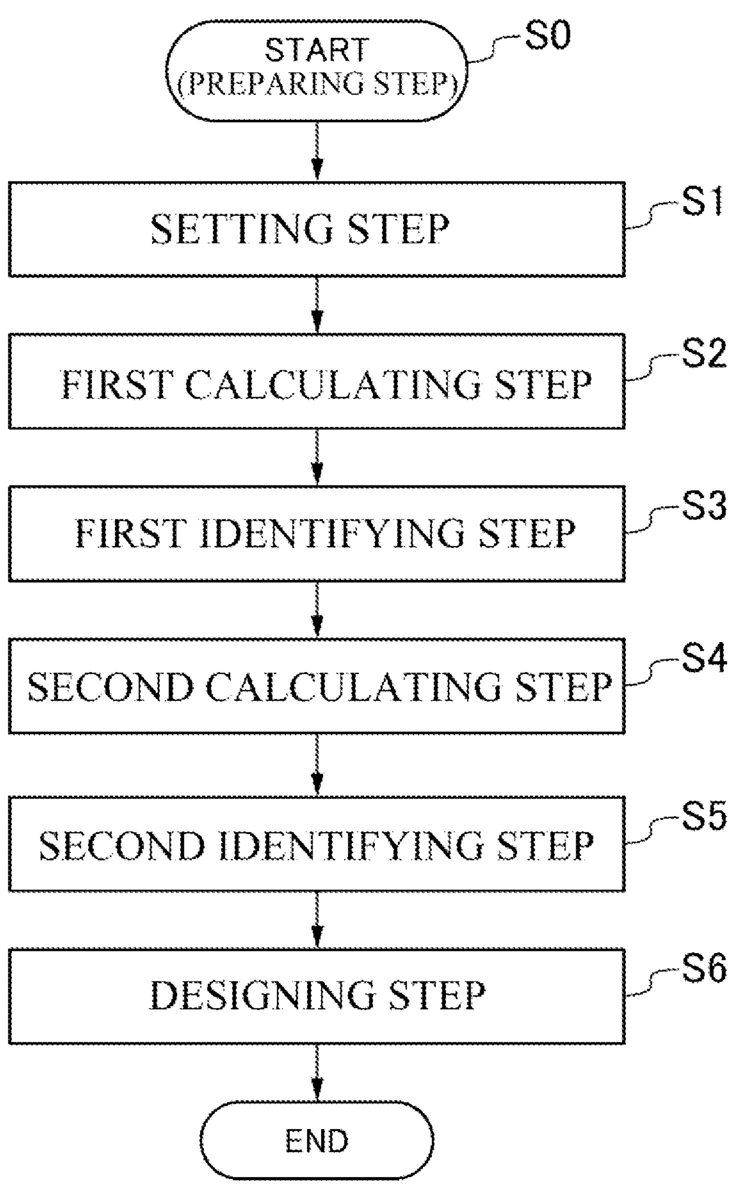
FIG. 2 is a flowchart illustrating an example of an optical design method according to an embodiment.

FIG. 1 is a schematic diagram illustrating an example of a configuration in which a metalens 1 and a conventional lens 2 are used in combination. FIG. 2 is a flowchart illustrating an example of an optical design method according to an embodiment.

The optical design method according to the embodiment can be used for achieving optical design of the configuration in which the metalens 1 and the conventional lens 2 are used in combination, for example, as illustrated in FIG. 1. In the optical design method, for example, based on a configuration in which a diaphragm 3, the metalens 1, and the conventional lens 2 are provided in this order, information on a collected light 5 at incidence of a parallel light 4 from an infinite object can be acquired.

The metalens 1 means a lens classified as a diffractive optical element. The conventional lens 2 means a common lens, such as a refractive lens, a divergent lens, and a reflective lens, having characteristics different from the metalens 1.

The optical design method according to the embodiment includes, for example, as illustrated in FIG. 2, a setting step S1, a first calculating step S2, a first identifying step S3, a second calculating step S4, and a second identifying step S5, and may include, for example, a designing step S6. For example, the optical design method may include a preparing step S0 of determining a specification to be designed.

Figure 3:
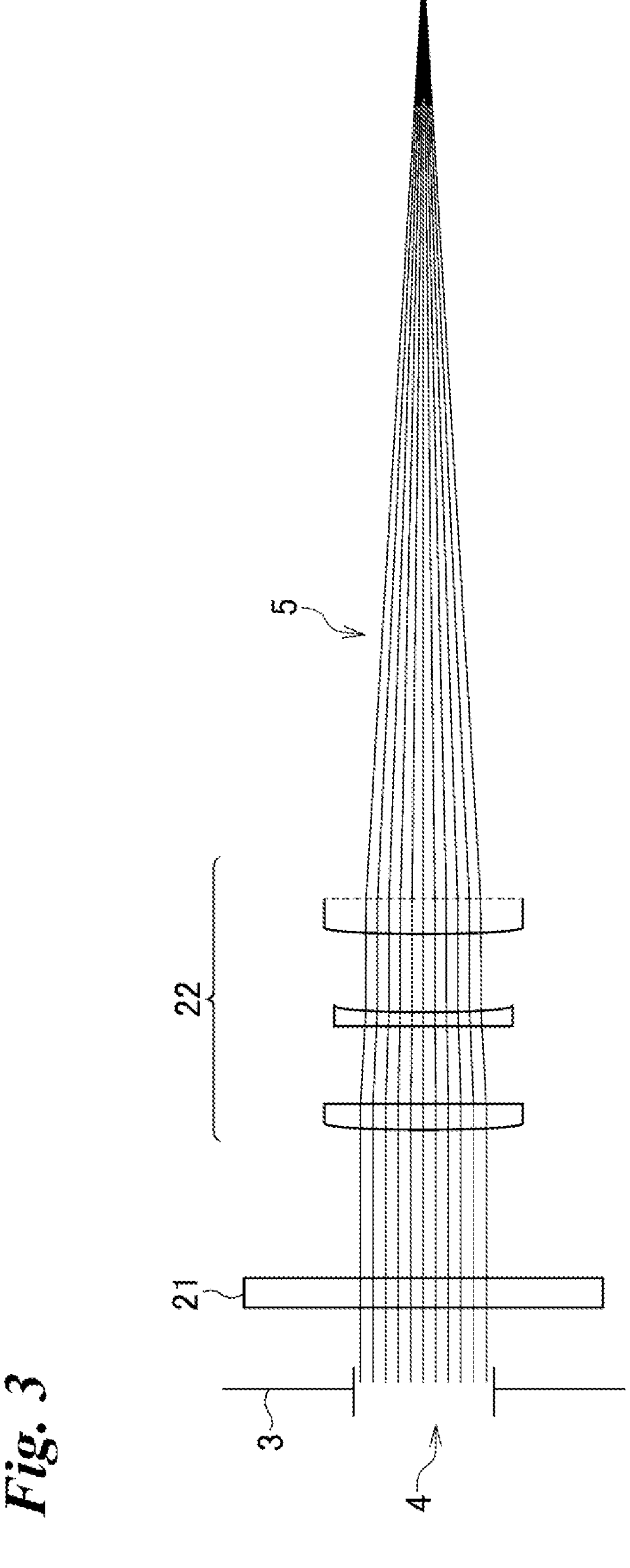
FIG. 3 is a schematic diagram illustrating an example of a configuration in optical design using a binary optic and a conventional lens in combination.

For example, as illustrated in FIG. 3, in the setting step S1, an optical property is determined based on optical design of a configuration in which a binary optic 21 and a conventional lens 22 for initial setting are used in combination. The optical property includes, for example, a step pattern (for example, a first step pattern) provided to the binary optic 21, and can be calculated using publicly known optical design software for optical tracking. The optical property may include parameters, such as a wavelength, a focal length, an F-number, and various allowable aberration amounts, and may include, for example, characteristics of a transmitted wavefront or a reflected wavefront.

In the first calculating step S2, first phase data indicating a relation of a phase to a shape of a meta-atom is calculated based on a preliminarily set first wavelength 21. The first phase data indicates, for example, the above-described relation based on the influence of a nonlinear component. In the first calculating step S2, for example, phase data, such as the first phase data, can be calculated using publicly known optical software of a vector model. The phase data is calculated using parameters, such as a material, a refractive index, a shape (for example, a cylinder) of the meta-atom, a height of the meta-atom, and a corresponding wavelength of the metalens 1 to be designed.

In the first identifying step S3, a first phase pattern is calculated from the first step pattern, and a fine pattern indicating the shape of the meta-atom corresponding to the first phase pattern is identified by referring to the first phase data. An exemplary method for identifying the fine pattern will be described later.

In the second calculating step S4, second phase data different from the first phase data is calculated based on a preliminarily set second wavelength 22 different from the first wavelength 21. The second phase data can be calculated using publicly known optical software of a vector model, for example, similarly to the above-described first phase data.

In the second calculating step S4, for example, a plurality of pieces of the phase data may be calculated in addition to the second phase data. In this case, in the second calculating step S4, the plurality of pieces of phase data are calculated based on respective different wavelengths.

In the second identifying step S5, with reference to the second phase data, a second phase pattern corresponding to the fine pattern identified in the first identifying step S3 is identified. An exemplary method for identifying the second phase pattern will be described later.

In the second identifying step S5, for example, a plurality of phase patterns may be identified with reference to the plurality of pieces of phase data calculated in the second calculating step S4 in addition to the second phase pattern. Any number of the phase patterns may be identified.

In the designing step S6, for example, the conventional lens 2 is designed based on the second phase pattern. In the designing step S6, for example, the optical design of the conventional lens 2 can be performed using publicly known optical design software for optical tracking. The designed conventional lens 2 is, for example, equal to the conventional lens 22 for initial setting in the setting step S1, and additionally may have different characteristics. The designing step S6 may be performed as necessary.

In the designing step S6, for example, the conventional lens 2 may be designed based on the phase data (for example, the second phase data) calculated in the second calculating step S4. In the designing step S6, for example, the conventional lens 2 may be designed based on the first phase pattern or the first step pattern in addition to the second phase pattern. Also in these cases, in the designing step S6, for example, the optical design of the conventional lens 2 can be performed using publicly known optical design software for optical tracking.

Here, each of the first phase pattern and the second phase pattern is linked with the fine pattern of the same metalens 1. Therefore, the use of the first phase pattern and the second phase pattern allows easily expressing characteristics of the metalens 1, thereby allowing facilitating the design of the conventional lens 2 used in combination with the metalens 1.

Note that in the designing step S6, for example, the conventional lens 2 may be designed based on the plurality of phase patterns identified in the second identifying step S5 in addition to the second phase pattern.

The following describes an exemplary optical design method in detail. In the following description, for the binary optic 21, the binary optic 21 with the first phase pattern in the setting step S1 is referred to as BO-A, the binary optic 21 with the second phase pattern in the second identifying step S5 is referred to as BO-B, and the n binary optics 21 with any one of the plurality of phase patterns in the second identifying step S5 are referred to as BO-n (n is an integer of 1 or more). The BO-n may have the same characteristics as the BO-A or the BO-B.

<Setting Step S1>

In the setting step S1, the optical property is determined based on optical design of a configuration in which the BO-A and the conventional lens 22 for initial setting are used in combination. The optical property includes, for example, a first step pattern provided to the BO-A. In the setting step S1, for example, conditions of the above-described configuration are set based on a specification determined in the preparing step S0.

In the setting step S1, for example, the optical property is determined based on optical design of a configuration in which the BO-A and the conventional lens 22 are used in combination using an equivalent refractive index method. In the setting step S1, for example, the optical design is performed to achieve the optical property that satisfies a specification necessary for an on-axis angle of view, an off-axis angle of view, and a plurality of wavelengths. Any type of the conventional lens 22 for initial setting may be used, and the number of the conventional lens 22 for initial setting may be appropriately set.

<First Calculating Step S2>

In the first calculating step S2, the first phase data is calculated based on the preliminarily set first wavelength λ1. In the first calculating step S2, the phase data is calculated using publicly known optical software of a vector model. Therefore, the calculated phase data indicates data in which the above-described influence of nonlinearity caused by the "optical trap" is considered. This allows the design of the fine pattern of the metalens 1 relative to the first step pattern of the BO-A.

Figure 4:
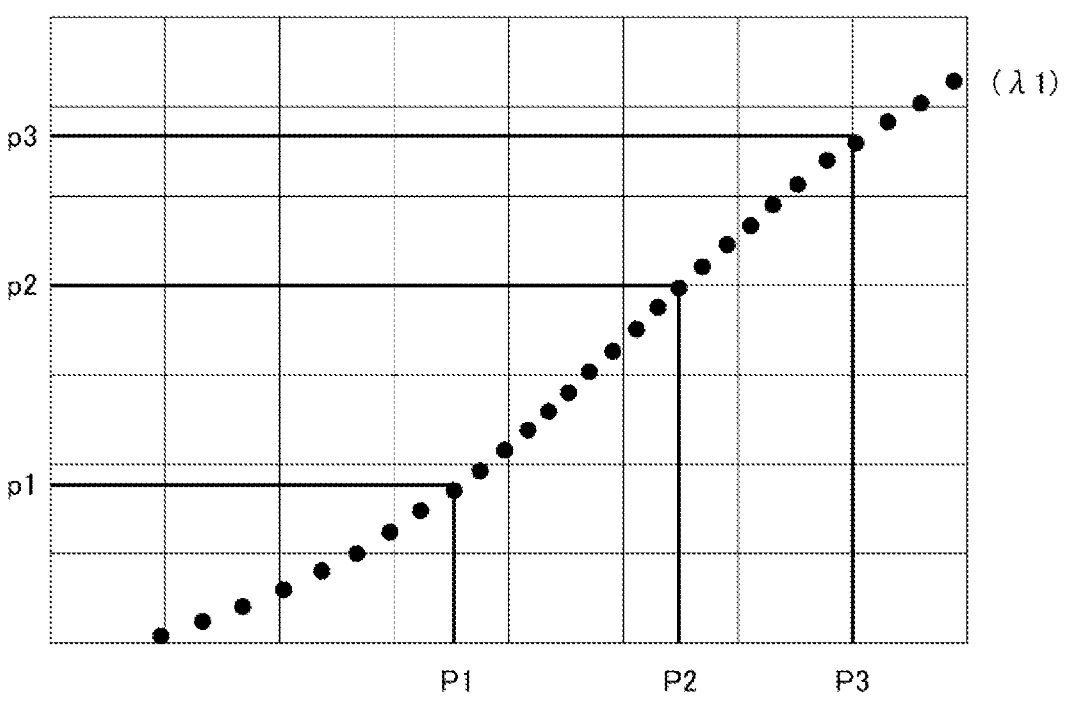
FIG. 4 is a graph illustrating an example of phase data.

For the first phase data, for example, as illustrated in FIG. 4, the horizontal axis indicates the shape of the meta-atom (for example, cylinder diameters P1, P2, and P3), and the vertical axis indicates the phase (for example, p1, p2, and p3). The first phase data has a characteristic in which the phase nonlinearly changes relative to the change in shape of the meta-atom. This allows the design of the fine pattern of the metalens 1 having a complicated property with high accuracy. Note that in the phase pattern, the relation between the phase and the shape of the meta-atom differs for each wavelength. Therefore, when the phase data is calculated based on a wavelength different from the first wavelength 21, phase data different from the first phase data is obtained.

<First Identifying Step S3>

In the first identifying step S3, the first phase pattern is calculated from the first step pattern of the BO-A, and the fine pattern corresponding to the first phase pattern is identified by referring to the first phase data.

Figure 5:
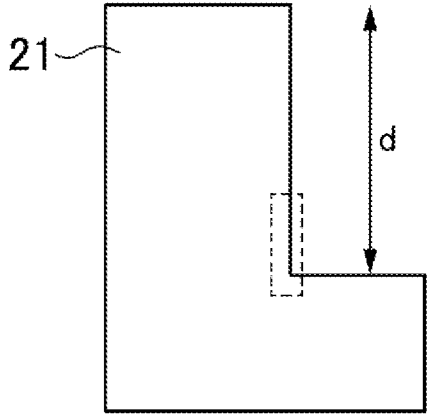
FIG. 5 is a schematic diagram illustrating an example of a step of the binary optic.

Here, a relation between a step d included in the step pattern of the binary optic 21 (the BO-A here) and the phase will be described. For example, as illustrated in FIG. 5, in a case where the step d of the binary optic 21 is set in a relation expressed by a formula (2) below, when a plane wave light of a normal incidence to the binary optic 21 is transmitted, a phase difference of ax is generated due to the influence of the step d.

$$Nd-d=\alpha\lambda \tag{2}$$

Here, characters in the formula (2) are as follows.

λ: wavelength of the light

N: refractive index of a material of the binary optic 21 (for example, a relative refractive index to air)

α: any given coefficient (different depending on a specification)

From the formula (2), for the heights of respective steps of the binary optic 21, the phase differences appropriate for the specification can be obtained by changing the coefficient α to different values. For example, when a is set to 1, the step d satisfying the phase difference 2π can be derived. In the first identifying step S3, for example, the use of the formula (2) allows calculating the first phase pattern from the first step pattern.

Figure 6:
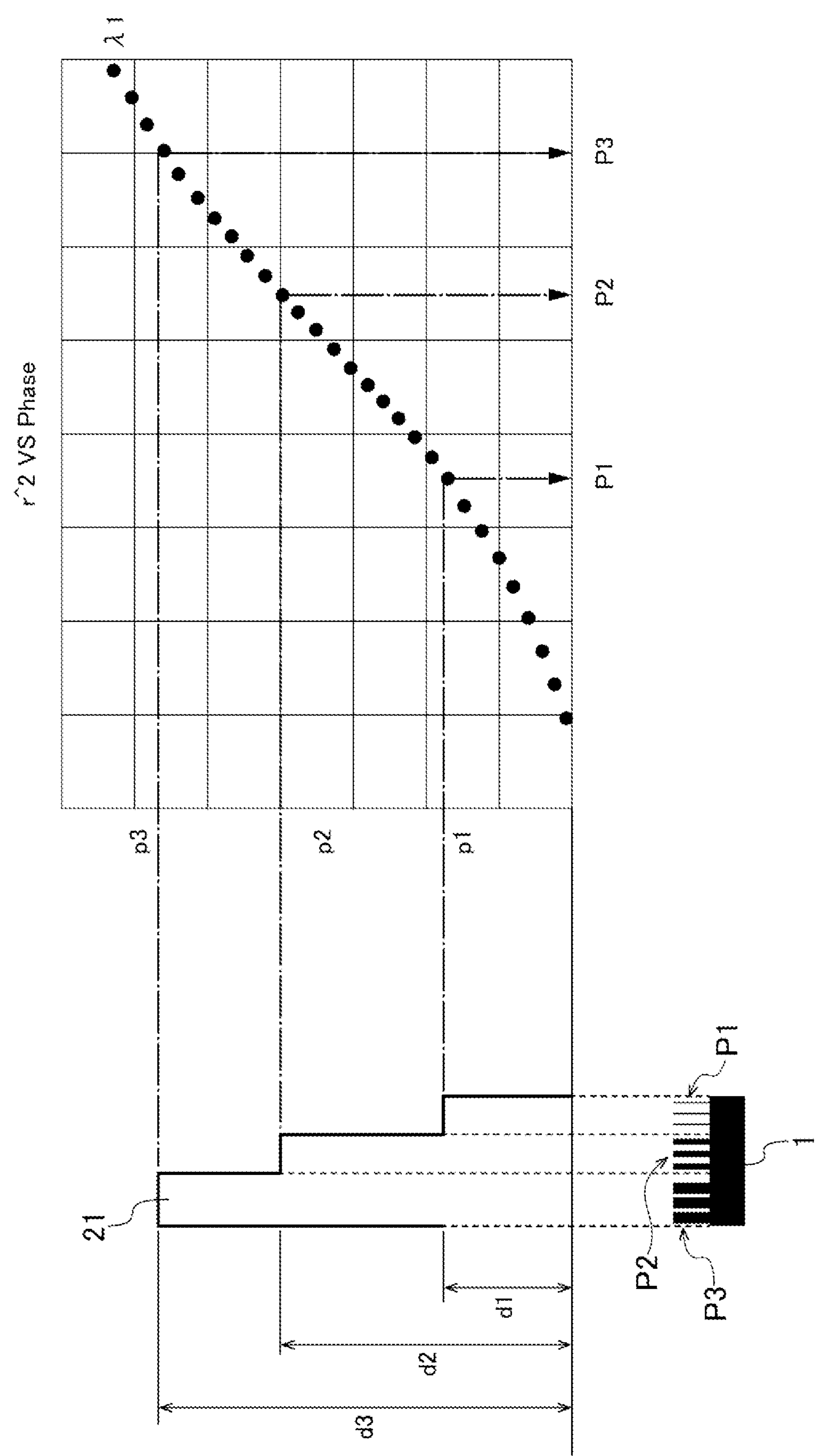
FIG. 6 is a schematic diagram illustrating an example of a process of identifying a fine pattern corresponding to a step pattern.

In the first identifying step S3, for example, as illustrated in FIG. 6, the phase pattern (p1, p2, and p3 in FIG. 6) is calculated from the step pattern (d1, d2, and d3 in FIG. 6) using the formula (2). Then, in the first identifying step S3, the fine pattern (P1, P2, and P3 in FIG. 6) corresponding to the calculated phase pattern (p1, p2, and p3) is identified by referring to the first phase data. Thus, in the first identifying step S3, since the fine pattern is identified by referring to the first phase data, the design of the metalens 1 in consideration of the influence of the nonlinearity due to the "optical trap" can be facilitated.

<Second Calculating Step S4>

In the second calculating step S4, one or more pieces of the phase data (for example, the second phase data and third phase data) corresponding to the respective wavelengths are calculated based on the preliminarily set one or more wavelengths (for example, the second wavelength λ2 and a third wavelength λ3). The phase data can be calculated using publicly known optical software of a vector model similarly to the above-described first phase data.

<Second Identifying Step S5>

In the second identifying step S5, one or more phase patterns different for each piece of the phase data are identified by referring to the one or more pieces of the phase data calculated in the second calculating step S4.

Figure 7:
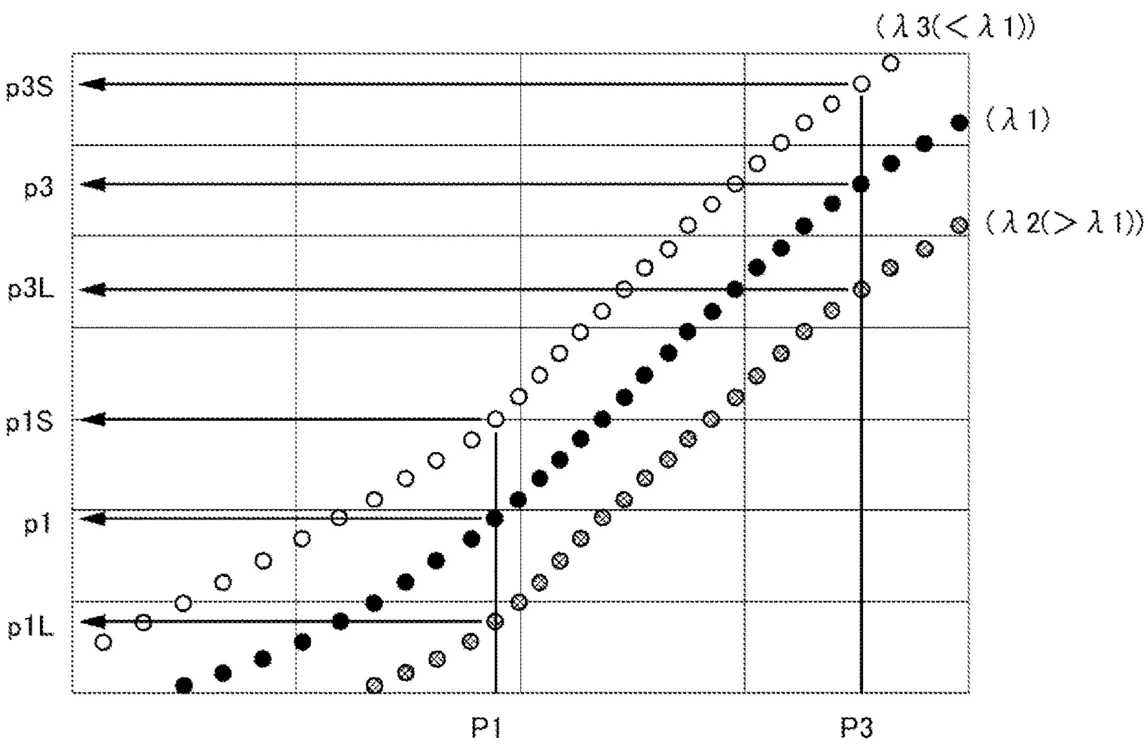
FIG. 7 is a schematic diagram illustrating an example of a difference between pieces of the phase data different in wavelength.

In the second identifying step S5, the phase pattern is identified using characteristics of the phase data. For example, as illustrated in FIG. 7, when the second wavelength λ2 is a wavelength longer than the first wavelength λ1, the second phase data exhibits a characteristic of being entirely shifted to the right side with respect to the first phase data. When the third wavelength $\lambda 3$ is a wavelength shorter than the first wavelength $\lambda 1$, the third phase data exhibits a characteristic of being entirely shifted to the left side with respect to the first phase data.

Based on the above-described characteristics, the phase patterns are identified for the respective pieces of the phase data corresponding to the fine patterns (P1 and P3 in FIG. 7) calculated in the first identifying step S3. That is, in a case of referring to the second phase data, the phase pattern (the second phase pattern) including a phase p1L corresponding to a diameter P1 and a phase p3L corresponding to a diameter P3 is identified. In a case of referring to the third phase data, the phase pattern (a third phase pattern) including a phase p1S corresponding to the diameter P1 and a phase p3S corresponding to the diameter P3 is identified.

<Designing Step S6>

In the designing step S6, for example, the conventional lens 2 is designed based on the plurality of phase patterns including the second phase pattern. In the designing step S6, when publicly known optical design software is used, the conventional lens 2 can be designed using, for example, the number of lenses different from the conventional lens 22 for initial setting and a material characteristic of a different glass material as parameters.

Figure 8A:
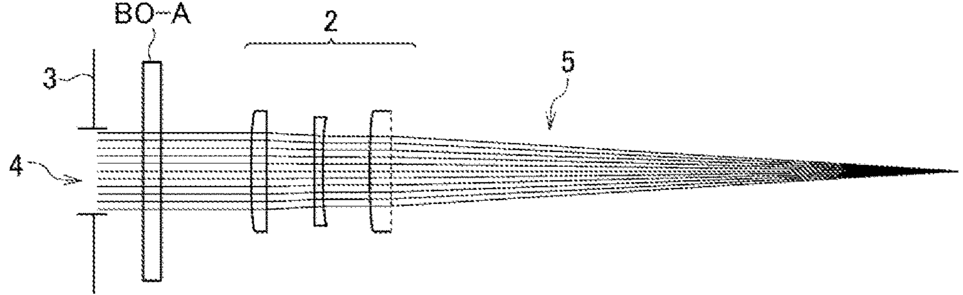
FIG. 8A to FIG. 8C are schematic diagrams illustrating examples of configurations in optical design using binary optics having different step patterns and a conventional lens in combination.
Figure 8B:
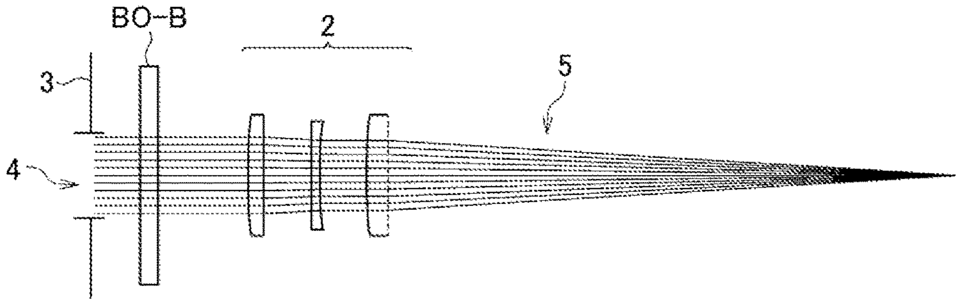
Figure 8C:
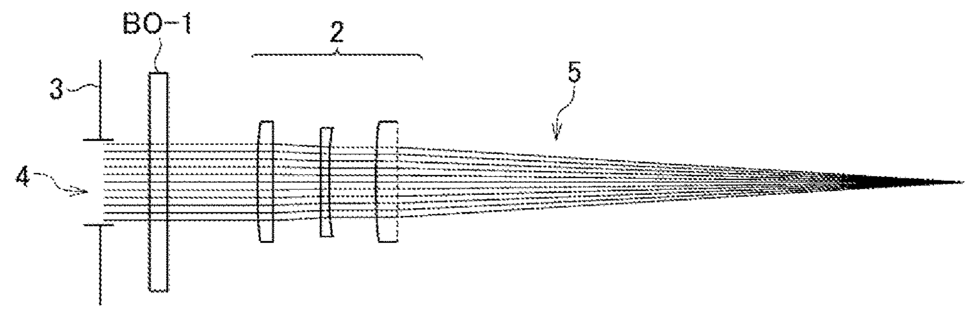

For example, when a plurality of wavelengths are assumed to be the three wavelengths (the first wavelength A1, the second wavelength 22, and the third wavelength 23), for example, as illustrated in FIG. 8A to FIG. 8C, the conventional lens 2 common to the binary optics 21 (the BO-A, the BO-B, and the BO-1 in FIG. 8A to FIG. 8C) corresponding to the respective wavelengths of the three wavelengths is designed based on the respective binary optics 21, thereby allowing achieving the design of the conventional lens 2 corresponding to the three wavelengths.

For example, a case where "CODE V (registered trademark)" is used as publicly known optical design software in the designing step S6 will be described.

First, as a premise, the use of "CODE V (registered trademark)" allows expression by a continuous phase distribution on an optical surface to which a diffractive optical element is applied without depending on a producing method. The phase distribution is expressed with $\varphi=f(r)$ in a case of rotation symmetry, and converted to a fringe distribution by dividing by a reference wavelength 20 referred to as a production wavelength HWL.

A wavelength with which the optimum efficiency can be obtained is specified as the production wavelength HWL, and the production wavelength HWL is used for calculating a depth of the step in a case of the binary optic 21. In the case of the binary optic 21, a phase $\varphi$ is not expressed in a stepped pattern like the shape of the binary optic 21, but expressed with a phase coefficient HCO(Cj) as an analog continuous quantity. For example, for the phase coefficient HCO(Cj), 10 phase coefficients (Cj: C1 to C10) can be input, thereby allowing expressing the shape of the phase.

For example, in the setting step S1, the phase can be calculated in the analog quantity using "CODE V (registered trademark)," and the first step pattern can be determined from the calculation result. As the first step pattern, for example, when a shape with eight stages is produced by a method referred to as three-step, exposure and etching in lithography are performed three times. An ideal value of the relative ratio of the etching amount is 1:2:4, and the magnitudes of the respective steps can be constant. When "CODE V (registered trademark)" is used, the calculation can be performed by setting "type (DIF)" to the step, and the shape of the first step pattern is determined from the production wavelength HWL and the phase coefficient HCO (Cj) described above. The magnitude of the step can be constant similarly to a case of production. The "type (DIF)" described above includes items of, for example, "linear diffraction grating," "phase polynomial (kinoform/binary)," "holographic optical element," and the like.

Based on the above, in the designing step S6, the production wavelength HWL can be calculated using the formula (2). In this case, with $\alpha$ set to 1, the largest phase is caused to correspond to Nd, and the smallest phase is caused to correspond to d among the second phase patterns, thereby allowing the wavelength $\lambda$ obtained in the right side of the formula (2) to be used as the production wavelength HWL.

For example, the phase coefficient HCO(Cj) can be set based on values of the respective phases included in the fine pattern identified in the first identifying step S3. Here, in "CODE V (registered trademark)," the set value is calculated as the phase of the continuous quantity. In contrast, the values of the respective phases included in the fine pattern each exhibit a discrete value. Therefore, for example, by connecting (unwrapping) the discrete values of the respective phases to the production wavelength HWL, a continuous (analog) value is obtained, and by fitting this process for each phase coefficient HCO(Cj), set values of the phase coefficients HCO(Cj) can be optimized. Note that by using the phase coefficient HCO(Cj) set in the setting step S1 for an initial value for fitting of the phase coefficient HCO(Cj), optimization can converge early.

For example, the conventional lens 2 can be designed by using the production wavelength HWL and the phase coefficient HCO(Cj) of the binary optic 21 corresponding to the second wavelength together with those of the first wavelength by the method as described above. The production wavelength HWL is not necessarily the second wavelength or the like, and this is caused by reduction of the diffraction efficiency of the second wavelength or the like of the metalens 1 having the fine pattern. Therefore, the production wavelength HWL set as the second wavelength or the like causes an unnecessary light, a flare, or a ghost, thus possibly reducing the optical performance. Therefore, the production wavelength HWL is preferably set to a value close to the second wavelength or the like, and this is possible by identifying the fine pattern of the meta-atom corresponding to the first wavelength.

For example, after the designing step S6, an evaluating step may be performed. In the evaluating step, whether or not the designed configuration satisfies the specification determined in the preparing step S0 or the like is determined, the process ends (End) when the specification is satisfied, and the setting step S1 is performed again when the specification is not satisfied. In the evaluating step, for example, when the specification is not satisfied, any one of the first calculating step S2 to the designing step S6 may be performed again.

According to the optical design method of the embodiment, the setting step S1 sets the first step pattern provided to the binary optic 21. The first identifying step S3 calculates the first phase pattern from the first step pattern, and identifies the fine pattern indicating the shape of the meta-atom corresponding to the first phase pattern by referring to the first phase data. Therefore, the fine pattern necessary for the design of the metalens 1 can be identified using the first step pattern that can be set by a conventional method. This allows easily achieving the optical design of the configuration including the metalens 1.

According to the optical design method of the embodiment, the setting step S1 sets the first step pattern based on the optical design of the configuration in which the binary optic 21 and the conventional lens 22 are used in combination. The first identifying step S3 calculates the first phase pattern from the first step pattern, and identifies the fine pattern indicating the shape of the meta-atom corresponding to the first phase pattern by referring to the first phase data. Therefore, the fine pattern necessary for the design of the metalens 1 can be identified using the first step pattern based on the use in combination with the conventional lens 22. This allows attempting facilitation of the optical design of the configuration in which the metalens 1 and the conventional lens 2 are used in combination.

This embodiment ensures, for example, the following. First, the design time of the metalens 1 alone can be reduced. When it is assumed that the metalens 1 alone is used for an imaging system, optimization for fitting the optical performance into the specification with the metalens 1 alone is required, and a calculation using an optical simulation of a vector model taking several hours for one condition needs to be performed multiple times. In contrast, according to the embodiment, it is only necessary to fit the optical performance of the metalens 1 into the specification together with the conventional lens 2, and this eliminates the need for the calculation using an optical simulation of a vector model for optimization to converge the optical performance performed multiple times on the metalens 1. Therefore, the object can be achieved by optimizing only the conventional lens 2.

First Modification

Next, the first modification of the optical design method according to the embodiment will be described. The first modification is different from the above-described embodiment in that the second step pattern is identified in the designing step S6. For the contents similar to those in the above-described embodiment, the description will be omitted.

In the designing step S6, for example, a step pattern corresponding to the identified phase pattern can be identified using the formula (2) described in the first identifying step S3. For example, the designing step S6 can identify the steps d derived for the respective phases included in the second phase pattern as the second step pattern provided to the BO-B, and can identify the steps d derived for the respective phases included in the third phase pattern as the third step pattern provided to the BO-1. That is, the designing step S6 can also identify the step patterns of the binary optic 21 different for each specific wavelength.

In the designing step S6, the conventional lens 2 is designed based on the identified one or more step patterns (for example, the second step pattern). At this time, publicly known optical design software, such as "CODE V (registered trademark)" described above, can be used. Accordingly, the design of the conventional lens 2 that can correspond to a plurality of wavelengths can be achieved.

Also in the above-described case, similarly to the above-described embodiment, the setting step S1 sets the first step pattern provided to the binary optic 21. The first identifying step S3 calculates the first phase pattern from the first step pattern, and identifies the fine pattern indicating the shape of the meta-atom corresponding to the first phase pattern by referring to the first phase data. Therefore, the fine pattern necessary for the design of the metalens 1 can be identified using the first step pattern that can be set by a conventional method. This allows easily achieving the optical design of the configuration including the metalens 1.

Second Modification

Figure 9:
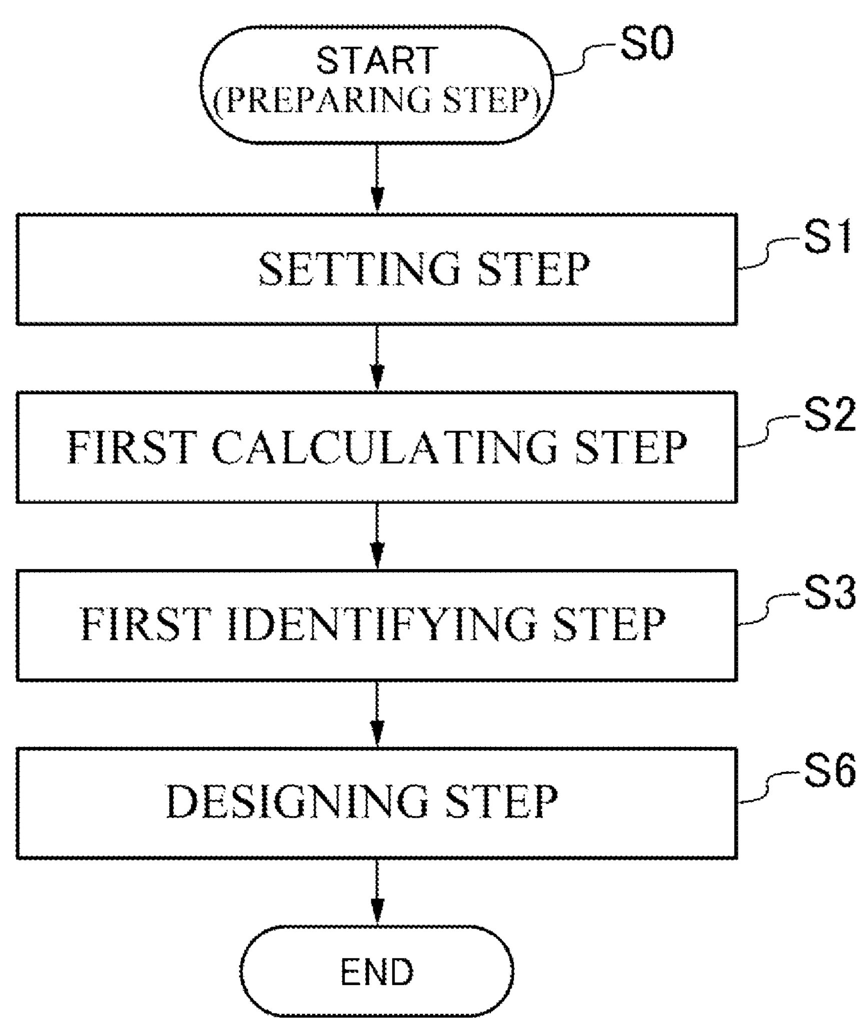
FIG. 9 is a flowchart illustrating a second modification of the optical design method according to the embodiment.
Figures 10A, 10B, 10C, 10D:
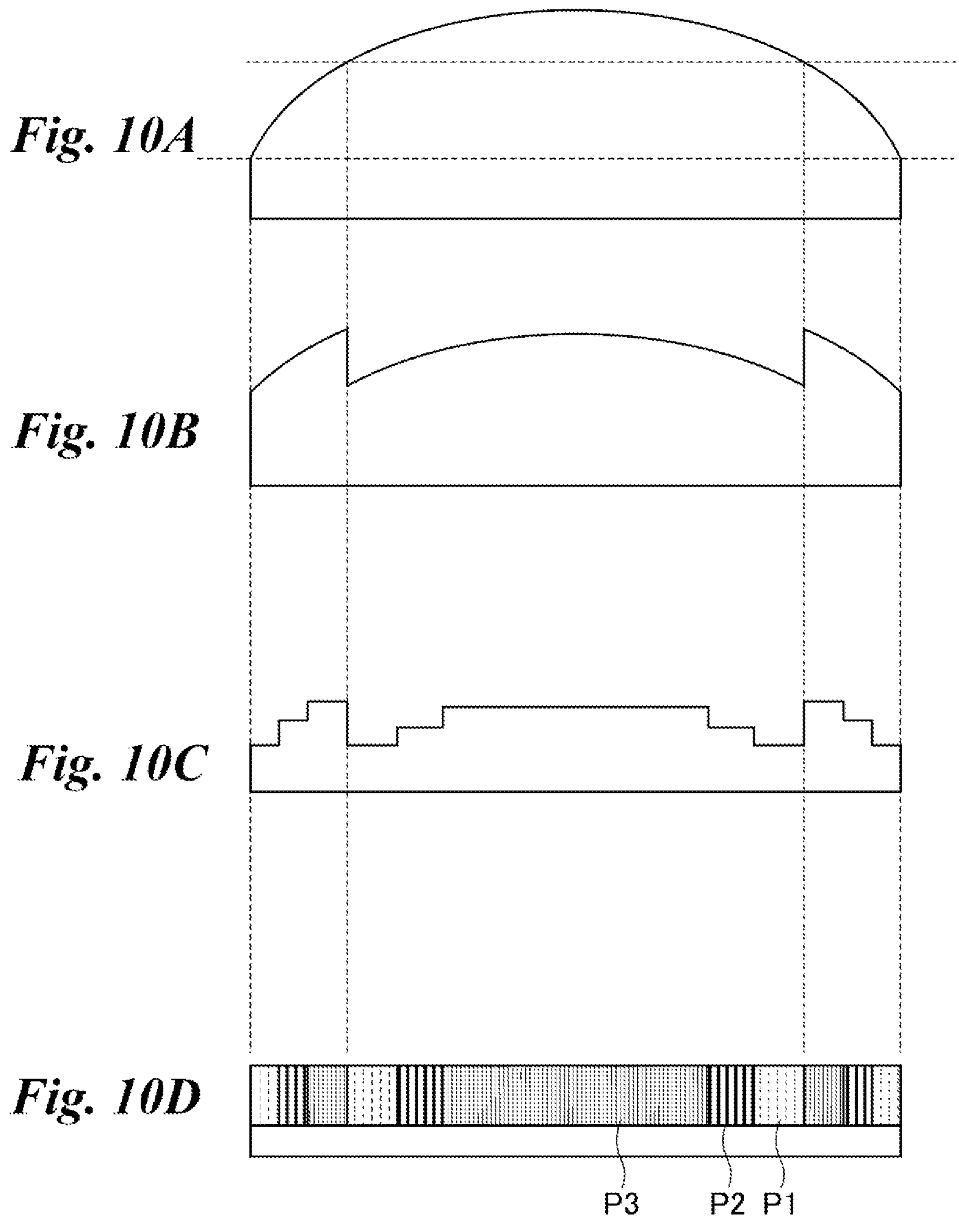
FIG. 10A is a schematic diagram illustrating an example of a conventional lens.
FIG. 10B is a schematic diagram illustrating an example of a Fresnel lens.
FIG. 10C is a schematic diagram illustrating an example of a binary optic.
FIG. 10D is a schematic diagram illustrating an example of a metalens.
Figure 11:
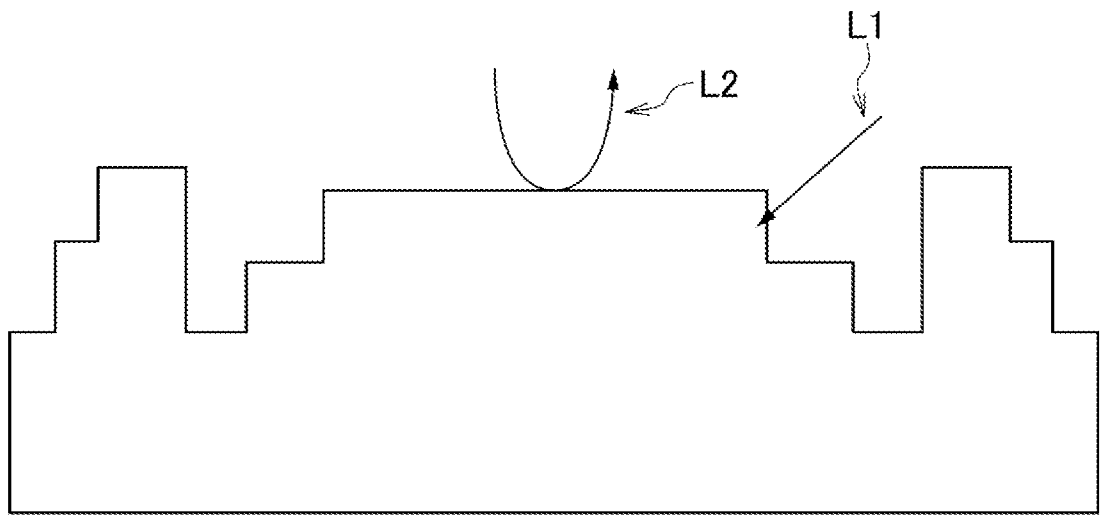
FIG. 11 is a schematic diagram illustrating an example of "Shadowing Effect" that occurs in a binary optic.
Figures 12A, 12B, 12C:
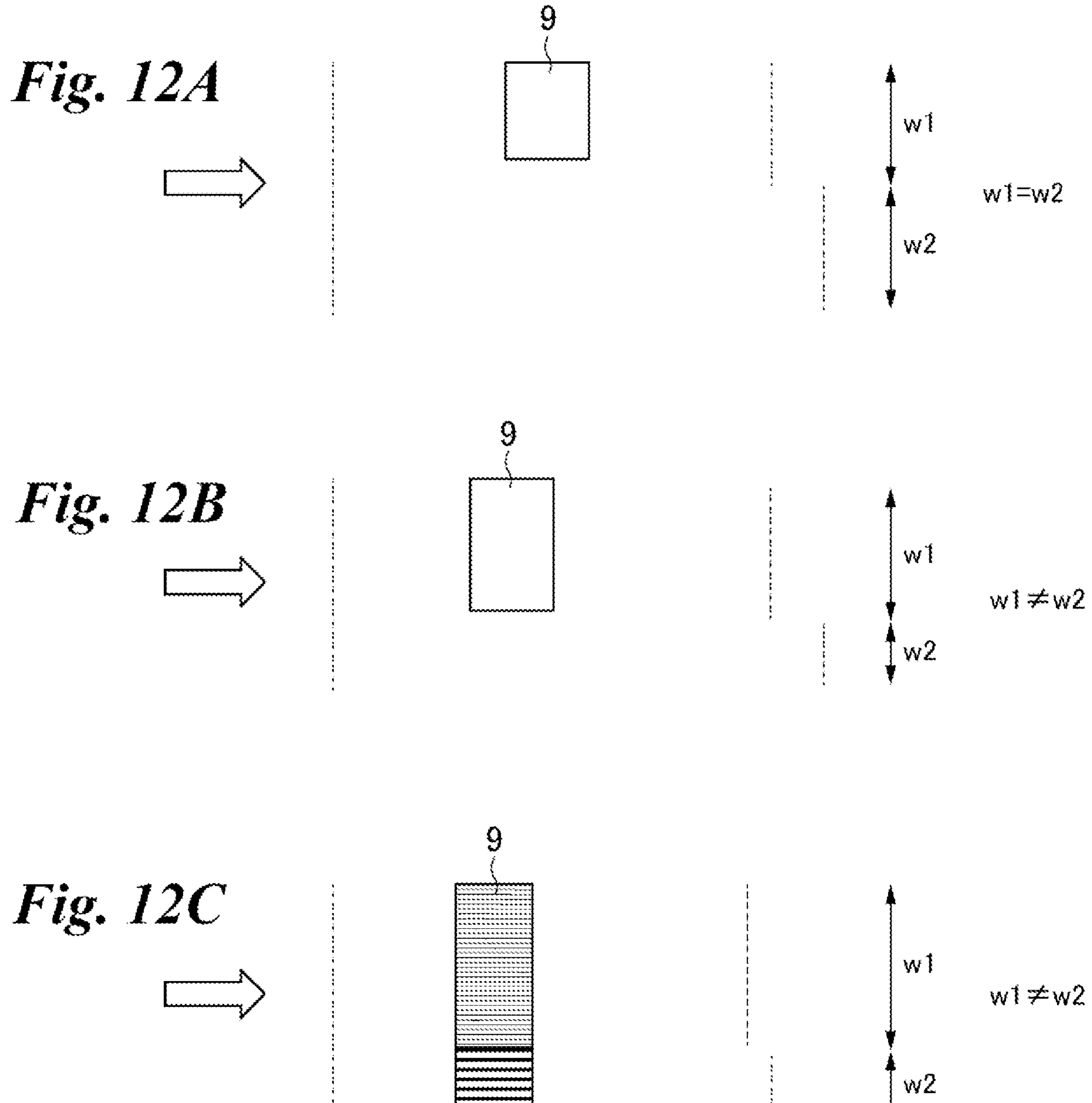
FIG. 12A to FIG. 12C are schematic diagrams illustrating examples of an effective refractive index.
Figure 13:
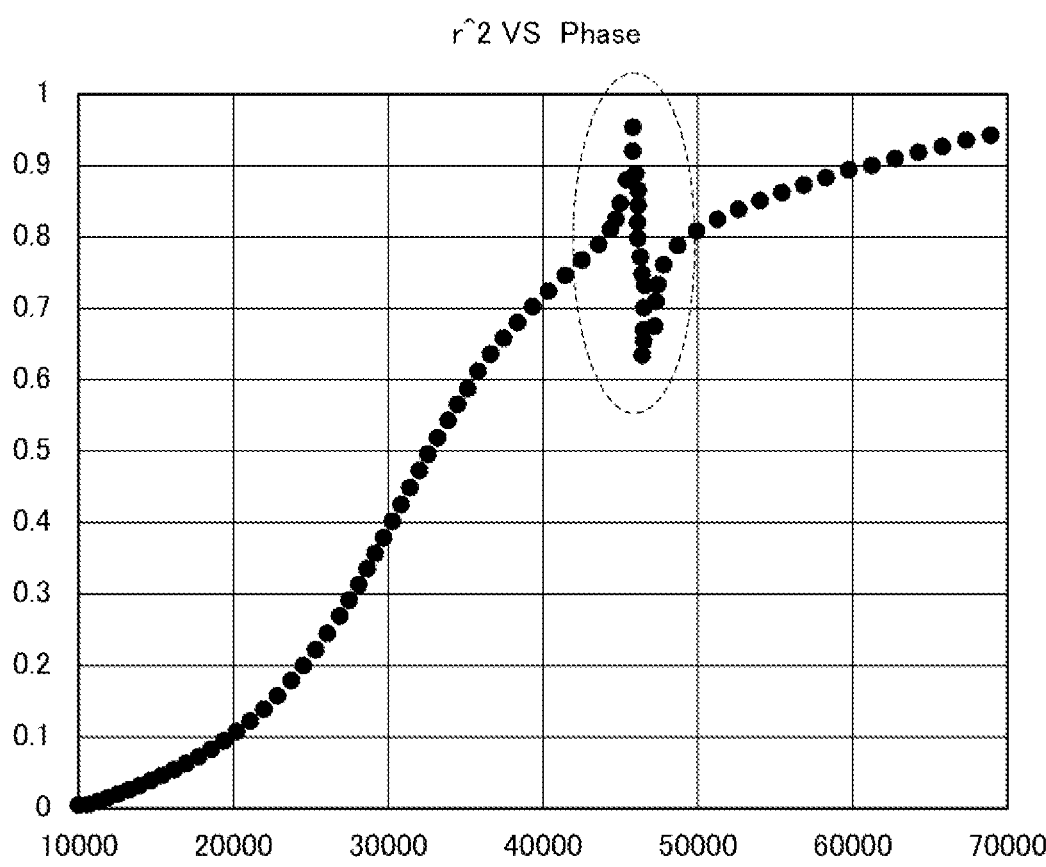
FIG. 13 is a graph illustrating a relation between a characteristic of a shape of a fine pattern and a phase.

Next, the second modification of the optical design method according to the embodiment will be described. FIG. 9 is a flowchart in the second modification of the optical design method.

The second modification is different from the above-described embodiment in that the second calculating step S4 or the second identifying step S5 is not performed. For the contents similar to those in the above-described embodiment, the description will be omitted.

The optical design method according to this modification includes, for example, as illustrated in FIG. 9, a setting step S1, a first calculating step S2, and a first identifying step S3, and may include, for example, a designing step S6.

In the setting step S1, the first step pattern may be set based on optical design of a configuration, for example, including only the binary optic 21 other than the optical design of the configuration in which the binary optic 21 and the conventional lens 22 are used in combination. That is, in the setting step S1 of this modification, the conventional lens 22 may be used as necessary.

Also in the above-described case, similarly to the above-described embodiment, the setting step S1 sets the first step pattern provided to the binary optic 21. The first identifying step S3 calculates the first phase pattern from the first step pattern, and identifies the fine pattern indicating the shape of the meta-atom corresponding to the first phase pattern by referring to the first phase data. Therefore, the fine pattern necessary for the design of the metalens 1 can be identified using the first step pattern that can be set by a conventional method. This allows easily achieving the optical design of the configuration including the metalens 1.

While the above-described embodiment has been described with the three different wavelengths, for example, as illustrated in FIG. 7 and the like, it is not necessarily required that the first wavelength is shorter than the second wavelength and longer than the third wavelength (that is, a wavelength in the center of the three wavelengths). For example, the following case is considered. When three wavelengths λ21, λ22, and λ23 have lengths of ×21>λ22>λ23, and a function of switching an illumination wavelength in use is provided, it is assumed that the illumination wavelength condition is as follows.

1 wavelength λ21+λ22+λ23 (broad)

2 wavelength λ23 alone (for example, a laser is used)

When the specification is set with optimized image forming performance and diffraction efficiency in a case of the wavelength λ23 alone, it is obvious that the object of the present invention is achieved by performing the design with the wavelength λ23 as the first wavelength and applying this proposal to the wavelengths λ21 and λ22.

A diffractive optical element (for example, the metalens 1) may be produced using the optical design method described above. This allows achieving production of a diffractive optical element reducing a load of optical design.

While the embodiments of the present invention have been described, these embodiments have been presented by way of examples, and are not intended to limit the scope of the invention. The novel embodiments described herein can be embodied in a variety of other configurations; furthermore, various omissions, substitutions, and changes can be made without departing from the spirit of the invention. The accompanying claims and their equivalents cover such embodiments and modifications as would fall within the scope and spirit of the invention.

DESCRIPTION OF REFERENCE SIGNS

1: Metalens
2: Conventional lens
3: Diaphragm
4: Parallel light
5: Collected light
21: Binary optic
22: Conventional lens
S0: Preparing step
S1: Setting step
S2: First calculating step
S3: First identifying step
S4: Second calculating step
S5: Second identifying step
S6: Designing step
d: Step

What is claimed is:

1. An optical design and manufacturing method comprising:

a setting step of setting a first step pattern provided to a binary optic based on optical design of a configuration in which the binary optic and a conventional lens are used in combination;

a first calculating step of calculating first phase data indicating a relation of a phase to a shape of a meta-atom based on a preliminarily set first wavelength;

a first identifying step of calculating a first phase pattern from the first step pattern and identifying a fine pattern indicating the shape of the meta-atom corresponding to the first phase pattern by referring to the first phase data;

a second calculating step of calculating second phase data different from the first phase data based on a preliminarily set second wavelength different from the first wavelength;

a second identifying step of identifying a second phase pattern corresponding to the fine pattern by referring to the second phase data;

a designing step of designing the conventional lens based on the second phase pattern for achieving optical design of the configuration in which a metalens having the fine pattern and the conventional lens are used in combination, and a producing step of producing the metalens based on the configuration designed through the designing step, wherein the first calculating step calculates the first phase data using optical software of a vector model, the designing step designs the conventional lens by optimizing only the conventional lens using optical design software for optical tracking without repeating calculations using the optical software of the vector model on the metalens.

2. The optical design and manufacturing method according to claim 1, wherein the designing step includes identifying a second step pattern corresponding to the second phase pattern and designing the conventional lens based on the second step pattern.

3. The optical design and manufacturing method according to claim 1, further comprising an evaluating step of determining whether or not designed configuration satisfies the specification determined after the designing step.

* * * * *